Figure 1:
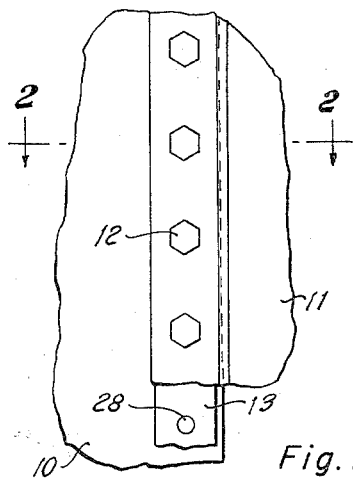

April 19, 1960     J. F. GIBB     2,933,006

BOLT HEAD HAVING STRESS FREE PROTECTIVE RUBBER COVERING

Filed Dec. 22, 1955     2 Sheets-Sheet 1

INVENTOR
John F. Gibb
BY Ahley & Ahley
ATTORNEYS

April 19, 1960     J. F. GIBB     2,933,006
BOLT HEAD HAVING STRESS FREE PROTECTIVE RUBBER COVERING
Filed Dec. 22, 1955     2 Sheets-Sheet 2

INVENTOR
John F. Gibb
BY Ashley & Ashley
ATTORNEYS

United States Patent Office 2,933,006
Patented Apr. 19, 1960

2,933,006

BOLT HEAD HAVING STRESS FREE PROTECTIVE RUBBER COVERING

John F. Gibb, Tulsa, Okla., assignor to National Tank Company, Tulsa, Okla., a corporation of Nevada Application December 22, 1955, Serial No. 554,688

2 Claims. (Cl. 85—1)

This invention relates to new and useful fastening members for the joints of corrosion-resisting tanks.

The invention is particularly concerned with the provision of a structure whereby metallic fastening members, such as bolts, may be employed for the securing together of the joints of tanks and vessels formed of reinforced synthetic resins or other corrosion-resisting materials, and whereby the fastening member is protected against any corrosive elements present in the tank or vessel.

In the manufacture and erection of bolted oil field storage tanks and other similar structures involving bolted joints or bolts extending through the wall of a container or vessel, it has been the practice to position the fastening bolts with their heads upon the inner side of the vessel and their shanks extending from the outer wall of the vessel for the reception of a nut or other fastening means. There are exceptions to this general practice, such as in the bottom wall of a vessel, but the above arrangement makes provision for the application and tightening of nuts upon the bolts from the outside of the vessel and eliminates the necessity for workmen being present within the vessel. It has also been the practice to provide some means for holding the heads of the bolts against rotation, so that the nuts or other fastening means may readily be tightened upon the threaded portion of the bolt to close the tank's joint or seam or affix a member to the tank or vessel wall.

It has also become a practice to construct tanks or vessels of corrosion-resisting materials such as certain metallic alloys, synthetic resins, coated or surfaced metallic plates, and the like. In the above-described arrangement, however, the head portions of the fastening bolts are necessarily exposed to the interior of the tanks and to the corrosive action of any materials present therein. Accordingly, a need has existed for a structure or means for providing a corrosion-resisting bolt structure, or protecting the heads of the bolts against the action of corrosive fluids or materials.

The present invention accomplishes the above objects and provides an improved bolt structure having a corrosion-protecting head, having means for holding the bolt against rotation during the tightening of the nut or other fastening means thereupon, and providing a completely corrosion-resistant structure.

It is a particular object of the invention to provide a protected bolt structure for tanks or other vessels having a novel combination of means for holding the bolt against rotation while protecting the head thereof, and means for maintaining the corrosion resistance of the bolthead structure at an optimum level.

Other and more specific objects will be apparent from a reading of the following specification and claims.

A construction designed to carry out the invention will be hereinafter described, together with other features of the invention.

Figure 2:
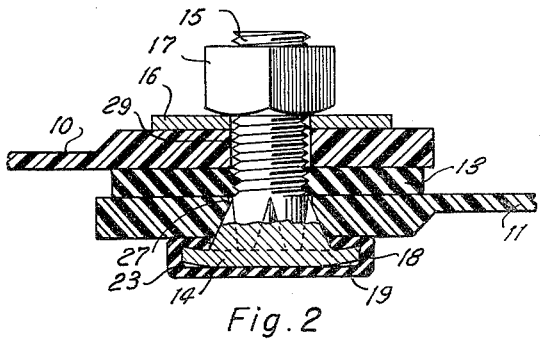
Figure 3:
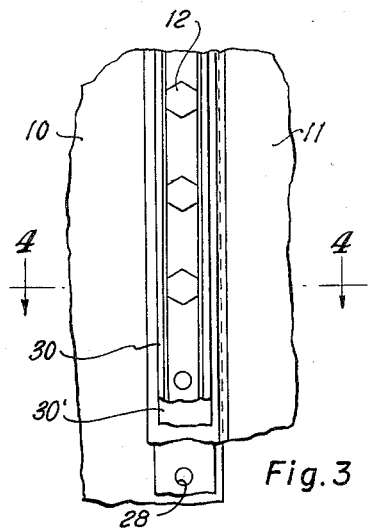
Figure 4:
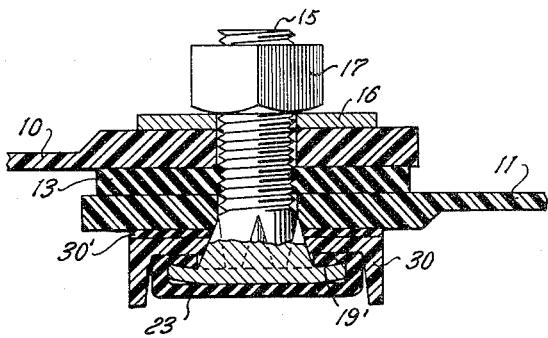
Figure 14:
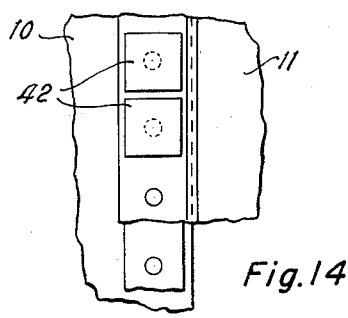
Figure 5:
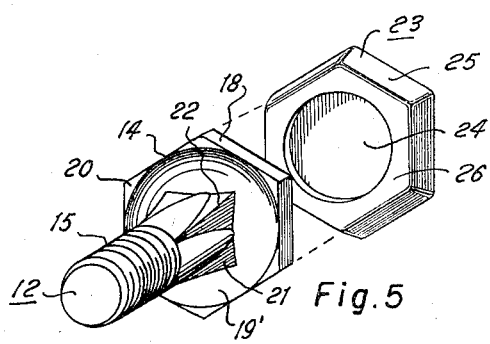
Figure 6:
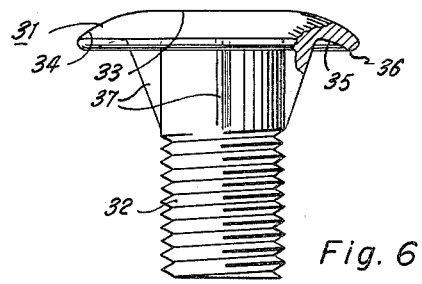
Figure 8:
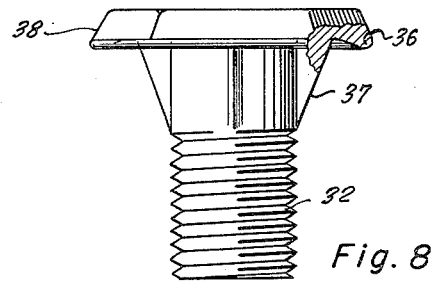
Figure 7:
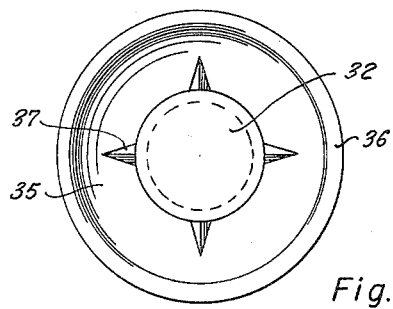
Figure 9:
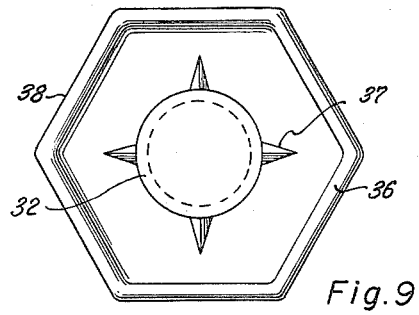
Figure 10:
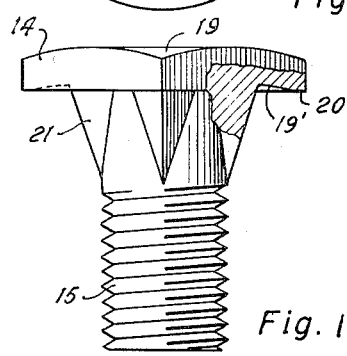
Figure 12:
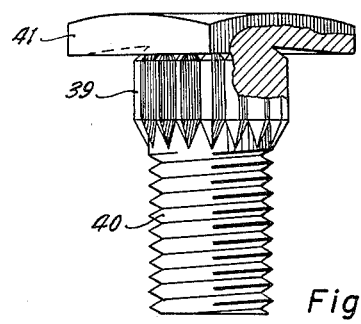
Figure 11:
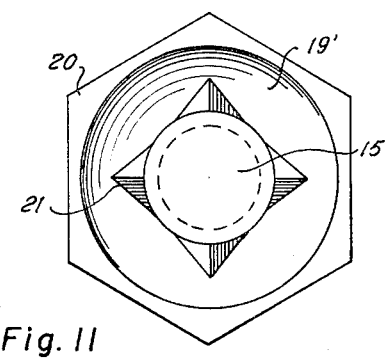
Figure 13:
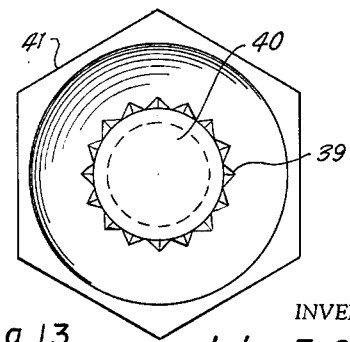

The invention will be more readily understood from a reading of the following specification and by reference to the accompanying drawings, wherein examples of the invention are shown, and wherein:

Fig. 1 is a fragmentary view, partly broken away, of a tank joint constructed in accordance with this invention, Fig. 2 is an enlarged, transverse, sectional view, taken upon the line 2—2 of Fig. 1, Fig. 3 is a view similar to Fig. 1 and illustrating the inclusion of a bolthead-retaining channel in the joint, Fig. 4 is an enlarged, transverse, sectional view, taken upon the line 4—4 of Fig. 3, Fig. 5 is an enlarged, exploded view in perspective of the bolt structure and the protective cap therefor, Fig. 6 is an enlarged view in elevation of a modified form of the bolt, Fig. 7 is a bottomside view of the bolt of Fig. 6, Fig. 8 is an enlarged view in elevation of a further modification of the bolt, Fig. 9 is a view of the underside of the bolt of Fig. 8, Fig. 10 is an enlarged view in elevation of a still further modification of the bolt structure, Fig. 11 is a view of the underside of the bolt of Fig. 10, Fig. 12 is an enlarged view in elevation of yet another form of the bolt structure, Fig. 13 is a view of the underside of the bolt of Fig. 12, and Fig. 14 is a view similar to Figs. 1 and 3, and illustrating a further modification of the joint structure employing large-headed bolts.

In the drawings, the numeral 10 designates the stave or wall of a vessel or tank, the stave being formed of corrosion-resisting steel of the nickel chromium type, or of other corrosion-resisting metallic alloys, but more desirably, of a reinforced synthetic resin having corrosion-resisting qualities superior to those of said alloys and being somewhat less expensive. In the fabrication of a tank or vessel, the edge of the plate 10 is joined to the overlapping edge of a similar plate 11, bolts 12 extending through the overlapping portions of the staves 10 and 11, and joining the two together. As shown in Fig. 2, it is conventional to position an apertured packing or gasket strip 13, formed of rubber, neoprene, or some similar rubber-like material, between the adjoining faces of the plates 10 and 11, to seal off the joint therebetween. The bolt 12 has its head 14 positioned upon the inner wall of the tank or vessel, and its shank 15 extending through the overlapping margins of the tank staves to clamp the two together, there being provided upon the outer end of the bolt the usual metallic washer 16 and nut 17.

The structure thus far described is conventional and known in the bolted tank art at the present time. Such structure necessarily, however, leaves the head of a bolt exposed to the interior of the vessel and subject to the corrosive action of any fluids or materials present therein.

In the present structure, the head 14 of the bolt 12 is formed with a polygonal periphery 18, desirably hexagonal, and a convex outer face 19. The underside of the bolthead facing the shank 15 of the bolt is concave, as shown at 19′, and is provided with a marginal sealing area 20 surrounding the concave portion and adjoining the periphery of the bolt.

The bolt is also provided with a knurled area on the shank immediately outwardly of the head for engaging the material of the tank stave 11 and aiding in holding the bolt against rotation. In the form of a bolt structure shown in Figs. 1 through 5, this knurled area or portion is formed by a plurality of pyramidal sections or projections 21 formed integrally of the bolt with their bases adjoining the head 14 and their apices merging into the shank 15. The projections are desirably triangular in cross section, having an inclined edge or corner 22 facing outwardly from the shank of the bolt for cutting and wedging into the material of the tank stave 11 to anchor the bolt rotationally with respect thereto.

The bolthead 14 receives a protective cover or cap 23, having a main portion 24 adapted to overlie the convex outer face 19 of the bolthead, and an inclined depending marginal skirt 25 shaped to conform to the periphery of the bolthead. An integral, inwardly-directed flange or lip 26 is carried by the skirt 25 and is adapted to underlie the marginal sealing area 20 when the protective cap is positioned upon the bolthead.

The cap member 23 is formed of rubber, neoprene, or some other natural or synthetic rubber or rubber-like material subject to flexure for positioning upon the bolthead and having high resistance to the action of whatever fluids or materials may be present within the tank or vessel structure.

In utilization of the bolt structure, the protective cap 23 is positioned upon the bolthead 14, and the shank of the bolt is passed through the bolt opening 27 of the tank stave 11, the bolt opening 28 of the sealing gasket 13, and the bolt opening 29 of the tank stave 10. The washer 16 and nut 17 may be positioned upon the projecting shank of the bolt and tightened thereupon to draw the projections 21 into wedging and locking engagement with the wall of the opening 27, but more desirably, the head of the bolt is given a sharp blow with a hammer or other tool to drive the projections 21 into wedging and holding relationship with the wall of the opening 27, after which the nut is tightened into position upon the shank of the bolt.

The engagement of the projections 21 with the wall of the opening 27 will hold the bolt against initial rotation as the nut 17 is tightened into position, and as the joint is drawn tighter, the further wedging and forcing of the projections 21 into the stave 11 more securely holds the bolt against rotation during the terminal portion of the tightening operation when slipping or rotation of the bolt is most likely to occur. Further, as the bolthead is urged toward the tank stave 11, the marginal sealing area 20 is brought into clamping engagement with the flange 26 which aids in holding the bolt against rotation during the final tightening operation.

The clamping of the flange 26 beneath the head of the bolt results in a sealing of the joint or space between the bolthead and the tank stave 11, thus completely encasing the exposed portions of the bolthead in the protective cap 23 as well as sealing off any possible path of fluid leakage around the shank of the bolt and through the openings of the staves 10 and 11. Thus, the need for any additional sealing ring or gasket is eliminated, the gasket strip 13 sealing off the joint between the staves 10 and 11 and preventing the access of fluid to the intermediate portion of the bolt shank 15.

The clamping of the flange 26 beneath the bolthead 14 also distorts the flange portion, causing the same to tend to flow outwardly toward the periphery of the bolthead and relaxing any strain which may have been impressed upon the main portion 24 of the protective cap member.

It is believed established that rubber-like materials, and especially the synthetic rubbers such as neoprene, butadiene, and the like, display increased resistance to the action of fluids when in an unstressed condition. Accordingly, it is highly advantageous for the bulk of the cap 23 to be free of strain when the bolt is tightened into its final position. This beneficial result is achieved in the present structure by the outward flowing of the flange 26 under the clamping action of the sealing area 20.

Further, it will be noted that the skirt portion 25 of the cap member 23 is inclined inwardly toward the shank of the bolt prior to positioning of the cap upon the bolthead, as shown in Fig. 5. Thus, when the cap is positioned upon the bolthead, the flange 26 is stretched or distorted to some slight extent, the walls of the skirt 25 come into parallel relationship with the periphery 18 of the bolthead, and the main portion 24 of the cap is relaxed and protected from strain. The outward flow of the flange portion 26 during tightening of the bolt further serves to insure the relief of any strain present in the main portion 24 and to maintain the protective cap in optimum protecting condition.

It is customary in joint structures of this general type to employ a bolthead retaining channel 30 through which the bolt is passed and between the flanges of which the boltheads are received to prevent rotation of the bolts during tightening of the nuts 17 thereon. As shown in Fig. 4, the channel member 30 may be employed with the present structure, or by reason of the above-described provisions for preventing rotation of the bolts during tightening, the channel may be omitted entirely, as shown in Fig. 2. If the channel 30 is employed, a sealing strip or gasket 30' should be positioned between the channel and the stave 11.

The bolt structure is subject to modification and variation as shown in Figs. 6 through 9. The form of the bolt shown in Figs. 6 and 7 is similar to that previously described and includes a head portion 31 having a depending, threaded shank 32. In place of being polygonal, the bolthead 31 is circular and provided with a relatively flat outer face 33 surrounded by a convex marginal portion 34. The underside of the head adjoining the bolt shank is also relatively flat and surrounded by a concave marginal portion 35 merging into a peripheral bead or lip 36 of semi-circular cross section, thus providing a bolthead structure of relatively thin cross section surrounded by a marginal sealing portion curving smoothly in the direction of the bolt shank and terminating in the rounded lip or sealing bead or area 36. Anti-rotational fins or ribs 37, somewhat narrower in cross section than the projections 21 may be provided on the underside of the bolthead 31, the ribs 37 tapering or merging into the shank 32 and providing a knurled area for anti-rotational engagement with the tank staves.

Of course, the structure of Figs. 6 and 7 may be modified to include a polygonal or hexagonal head 38, as shown in Figs. 8 and 9, the remaining features of the latter bolt structure being substantially identical to those of the bolt of Figs. 6 and 7. The first described bolt structure is shown in further detail in Figs. 10 and 11, and a modification of the anti-rotational ribs 21 is shown in Figs. 12 and 13. The projections 21 have been found quite suitable for use with tank staves formed of synthetic resin or similar materials, but for use with a metallic stave or plate, it is desirable to reduce the radial dimensions of the projections 21 and to increase the number of such projections so as to provide the multiplicity of relatively narrow ribs or splines 39, as shown in Figs. 12 and 13. The splines 39 are desirably of triangular cross section and project outwardly from the shank 40 immediately below the bolthead 41 for engagement with the wall of the opening through which the bolt is passed. The multiplicity of smaller and more closely spaced projections, as pointed out hereinabove, has been found very suitable for utilization with metallic tank staves.

The structure and configuration of the head 41 of the bolt of Figs. 12 and 13 is substantially identical to that of the bolthead 14 previously described, and all of the illustrated and described bolt structures are adapted to receive the protective cap 23. Each of the structures is provided with a marginal sealing area on the underside of the bolthead for clamping the flange 26 of the cap 23 to the tank wall and sealing off and protecting the bolthead. Each of the structures also functions to relieve any strain present in the outer portion of the cap member, and otherwise provide the benefits and improved results of the first described form of the invention. Of course, in each instance, the protective cap member is suitably shaped and dimensioned for reception upon the particular bolthead structure being employed.

A still further modification of the bolt structure is shown in Fig. 14 in which the boltheads 42 are non-circular and have a maximum radial dimension greater than the spacing between adjacent ones of the bolt openings in the tank or vessel joint less the minimum radial dimension of the next adjacent bolthead. Thus, the boltheads 42 may be square or rectangular, as shown, or of other suitable shapes and dimensions. The size and spacing of the boltheads are such as to prevent rotation of the bolts, a portion of the bolthead engaging the next adjacent bolthead as the bolt seeks to revolve and effectively preventing such revolution or rotation of the bolt.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A fastening member for the joint of a corrosion-resisting tank including, a bolt member having a shank adapted to be positioned in an opening extending through the joint and to receive a retaining element on its outer end, a laterally-extending head of given dimensions on the inner end of the shank, and a cap of rubber-like resilient material having a main portion overlying the top side of the head, the cap having a depending marginal portion embracing the periphery of the head and being so dimensioned as to be in a substantially stressed condition when the cap is positioned upon the head, and an integral inwardly-directed flange carried by the marginal portion and underlying the bolt head, the flange being so dimensioned with respect to the bolt head as to be in a substantially stressed condition when the cap is positioned on the bolt head but to flow outwardly when the fastening member is tightened in the joint opening to relieve the main portion and the marginal portion of the cap of all stresses whereby all portions of the cap exposed to the interior of the tank display increased resistance to the action of fluids.

2. A fastening member as set forth in claim 1 wherein the head of the bolt member is substantially flat, and the main portion of the cap is substantially flat and substantially abuts the flat bolt head.

References Cited in the file of this patent

UNITED STATES PATENTS

| | | |
|---|---|---|
| 1,886,721 | O'Brien | Nov. 8, 1932 |
| 2,016,610 | Moeller | Oct. 8, 1935 |
| 2,326,455 | Gray | Aug. 10, 1943 |
| 2,439,244 | De Weese | Apr. 6, 1948 |
| 2,523,239 | Tinnerman | Sept. 19, 1950 |
| 2,726,009 | Murdock | Dec. 6, 1955 |

FOREIGN PATENTS

| | | |
|---|---|---|
| 673,953 | Great Britain | June 18, 1952 |